Oct. 29, 1940.   A. RITZINGER ET AL   2,219,400
HOSE NOZZLE SUPPORT
Filed July 15, 1939
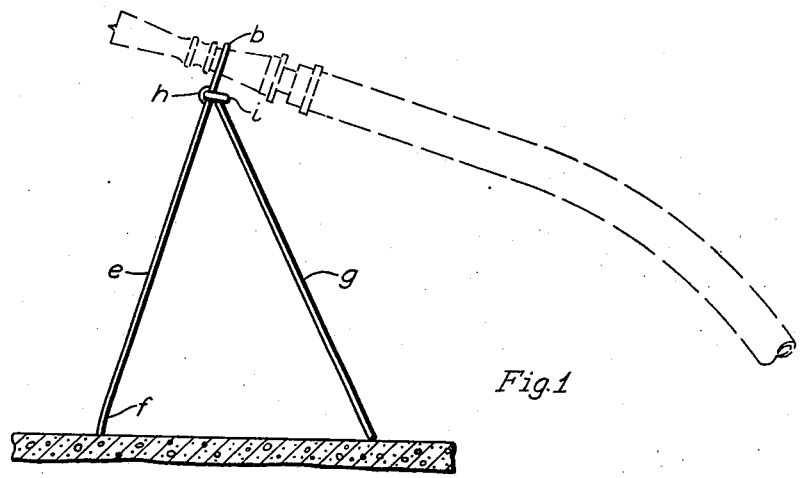
Fig. 1
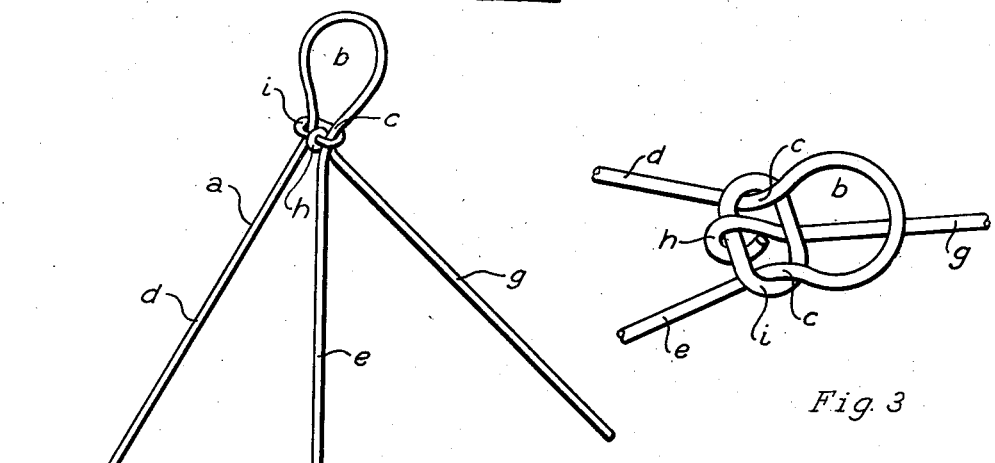
Fig. 2
Fig. 3
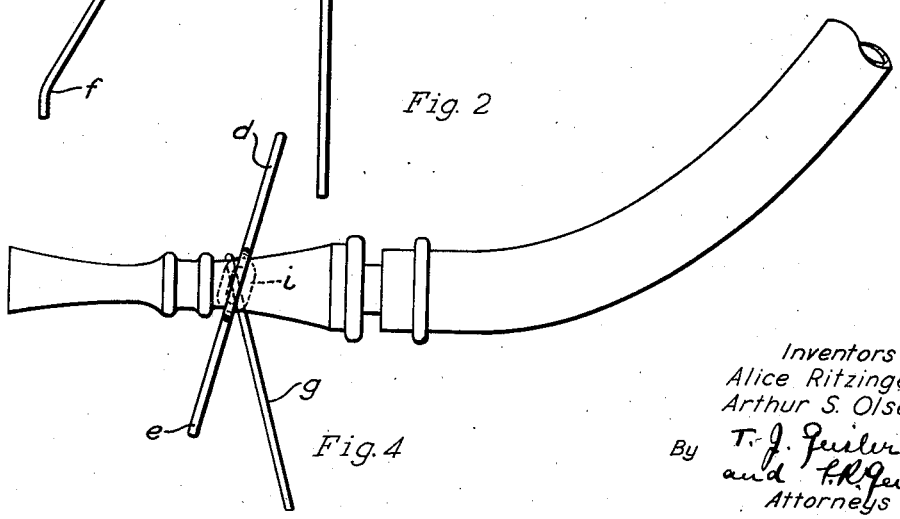
Fig. 4
Inventors
Alice Ritzinger
Arthur S. Olsen
By T. J. Geisler
and F. R. Geisler
Attorneys Patented Oct. 29, 1940

2,219,400

UNITED STATES PATENT OFFICE 2,219,400

HOSE NOZZLE SUPPORT

Alice Ritzinger and Arthur S. Olsen, Portland, Oreg.

Application July 15, 1939, Serial No. 284,690

2 Claims. (Cl. 248—83)

This invention relates to devices for supporting and holding the discharging end of a hose, particularly an ordinary garden hose, in close proximity to the ground while water or other liquid is being discharged from the hose. More specifically, this invention relates to means for holding a hose nozzle in any desired location spaced from the ground.

While various devices have previously been invented for a similar purpose, those which we have seen are either complicated, and thus more or less expensive to manufacture, or are suitable for use only in places where their supporting members can be stuck into the ground.
One of the objects of this invention is to provide a hose nozzle support which can be used on pavement as well as on the ground.

Another object of this invention is to provide a support of the character mentioned which will be exceedingly simple of construction and very inexpensive to manufacture.

We have observed that supports for hoses or hose nozzles, in common use, when not firmly inserted in the ground, are often thrown over by the force of the water which tends to move the hose sidewise when the hose is not arranged in a straight line. Therefore, a further object of our invention is to provide a hose nozzle support which, even though set up on pavement, can be so arranged as to brace itself against the tendency of the hose to move laterally when the adjacent end of the hose is not arranged in a straight line.

The manner in which these objects are attained will be apparent from the following description with reference to the accompanying drawing.

In the drawing:

Fig. 1 is a side elevation of the hose nozzle support with a portion of a garden hose and attached spray nozzle shown in broken line;

Fig. 2 is a perspective view of the support;

Fig. 3 is an enlarged detail view; and

Fig. 4 is a plan view illustrating a certain feature of our invention.

The entire hose nozzle support consists of only three members comprising two leg structures and a connecting link, and each member is made preferably of stiff wire or similar material. One member $a$ (see Fig. 2) is made of a piece of the wire or similar material formed with a reverse bend at its middle to constitute a loop $b$. At each end of the loop portion the wire is curved inwardly to form a neck portion $c$, beyond which the wire extends in diverging straight lines to constitute the two diverging leg portions $d$ and $e$. The extremities of the leg portions may be bent as at $f$ so that these end portions will be substantially vertical when the device is set up.

A second member comprises an oval ring $i$ which is placed on the device by being slipped over the leg portions $d$ and $e$ when the latter are squeezed together. The oval ring member $i$ is then slid upwardly until it reaches the neck portion $c$ below the loop $b$, as shown in Figs. 2 and 3. The spring action of the wire in the loop $b$ tending to cause the leg portions $d$ and $e$ to move in opposite directions, is sufficient to keep the ring $i$ in place on the neck portion $c$.

The third member $g$ comprises a straight leg portion with an eye $h$ at the top and this eye $h$ connects the member $g$ loosely to the oval ring $i$ as shown in Fig. 3. This member $g$ constitutes the third leg of a tripod structure when the device is set up, as shown in Fig. 2.

When the support is to be used, the oval ring $i$, with the member $g$ attached, having been slid into place on the neck portion $c$, the hose nozzle is inserted in the loop $b$ as shown in Fig. 1. The third leg member $g$ is then swung back between the other leg portions until it comes into contact with that part of the oval ring $i$ lying opposite to the side to which the member $g$ is attached by the eye $h$. Further backward movement of the third leg member $g$ is thus prevented by the ring $i$ with the result that this third leg serves as a firm brace for the other two leg portions $d$ and $e$ of the tripod. The entire device in this way becomes a stable tripod structure, the three leg members being held in place by the oval ring $i$, since this ring prevents further spreading of the leg portions $d$ and $e$ and further backward spreading of the third leg $g$, as explained. This tripod will stand firmly even though the bottom ends of the leg portions do not penetrate the surface of the ground, and it will also provide adequate support for the end of the hose and the hose nozzle when it is set up on a hard surface, such as pavement or a concrete wall, as illustrated in Fig. 1.

Should it be desired to secure the free end of the hose, without any nozzle, in our support, the loop $b$ can also be made to exert a slight pressure on the hose in order to hold it in the support. In such case the ring $i$, with the attached member $g$, is removed by being slid down over the legs $d$ and $e$; the end of the hose is inserted in the spread loop $b$; the ring $i$ is then slid back onto the legs $d$ and $e$ and moved upwardly, forcing the loop $b$ to exert a slight pinching action on the hose, until the ring is brought into place on the neck portion c. When this device is to be used with an ordinary garden hose nozzle, it will not be necessary to remove the oval ring i, but the nozzle can merely be inserted in the loop b. However, if the nozzle is of unusual shape or size, or if it is desired to clamp the nozzle more firmly, the ring i is first removed as previously explained.

When the nozzle is supported in such position that the adjacent end of the hose is curved, as illustrated by the plan view of Fig. 4, there will be a strong tendency for the hose to straighten itself out and for the force of the water to cause the nozzle to swing laterally in the tendency to bring the nozzle more into alinement with the main hose section. Such force might be sufficient to tip the device over, particularly when the device is used on a concrete walk or pavement, or the force might be sufficient to shove the device sidewise on the hard paved surface. However, any side movement of the device or any tendency of the device to be tipped over by such lateral force, can be prevented easily by swinging the third leg section g to one side, as shown in Fig. 4, to serve as a side brace and thereby resist the tendency of the hose to straighten out in that direction. For this purpose the eye h of the leg section g is made to fit loosely around the oval ring i, as shown in Fig. 3 and thus to accommodate the arrangement of the leg section g to one side when desired. The weight of the nozzle and of the raised end of the hose, combined with the proper positioning of the third member g will be sufficient to prevent movement of the support and will resist the tendency for the support to be pushed over even though a comparatively strong stream of water is delivered thru the nozzle.

Thus this device, though very simple in construction, will satisfactorily support the nozzle of an ordinary garden hose at any desired location and position and will be found equally satisfactory whether the support is set up on a penetratable or on an impenetratable surface.

It is possible, of course, to make slight modifications in our device without departing from the principle of our invention. It is not our intention to limit our invention otherwise than as set forth in the attached claims.

We claim:

1. A hose nozzle support of the character described comprising, a main member formed with a reverse bend at its middle to constitute a nozzle holding loop, said main member curved inwardly at each end of said loop to form a neck portion and then extending in diverging substantially straight lines beyond said neck portion to form a pair of supporting legs, a ring member around said neck portion of said main member, said ring member acting to confine said neck portion and to limit the spreading of said legs, and a third member having its upper end pivoted on said ring member at the front of said support, said third member adapted to be swung back between said diverging legs until its movement is stopped by engagement with the rear section of said ring member, whereby said third member will constitute a third leg for said support and said ring member will function to hold all three legs of said support against spreading thereby forming a rigid tripod suitable for being set up on a hard surface.

2. A hose nozzle support of the character described comprising, a main member formed with a reverse bend at its middle to constitute a nozzle holding loop, said main member curved inwardly at each end of said loop to form a neck portion and then extending in diverging substantially straight lines beyond said neck portion to form a pair of supporting legs, an oval ring member adapted to be slipped over said legs when said legs are pinched together and then slid upwardly to said neck portion, said oval ring member acting to confine said neck portion and to limit the spreading of said legs, and a third member having its upper end loosely pivoted on said oval ring member at the front of said support, said third member adapted to be swung back between said diverging legs until its movement is stopped by engagement with the rear section of said oval ring member, whereby said third member will constitute a third leg for said support and said oval ring member will function to hold all three legs of said support against spreading thereby forming a rigid tripod suitable for being set up on a hard surface.

ALICE RITZINGER.
ARTHUR S. OLSEN.